Patented Feb. 16, 1937

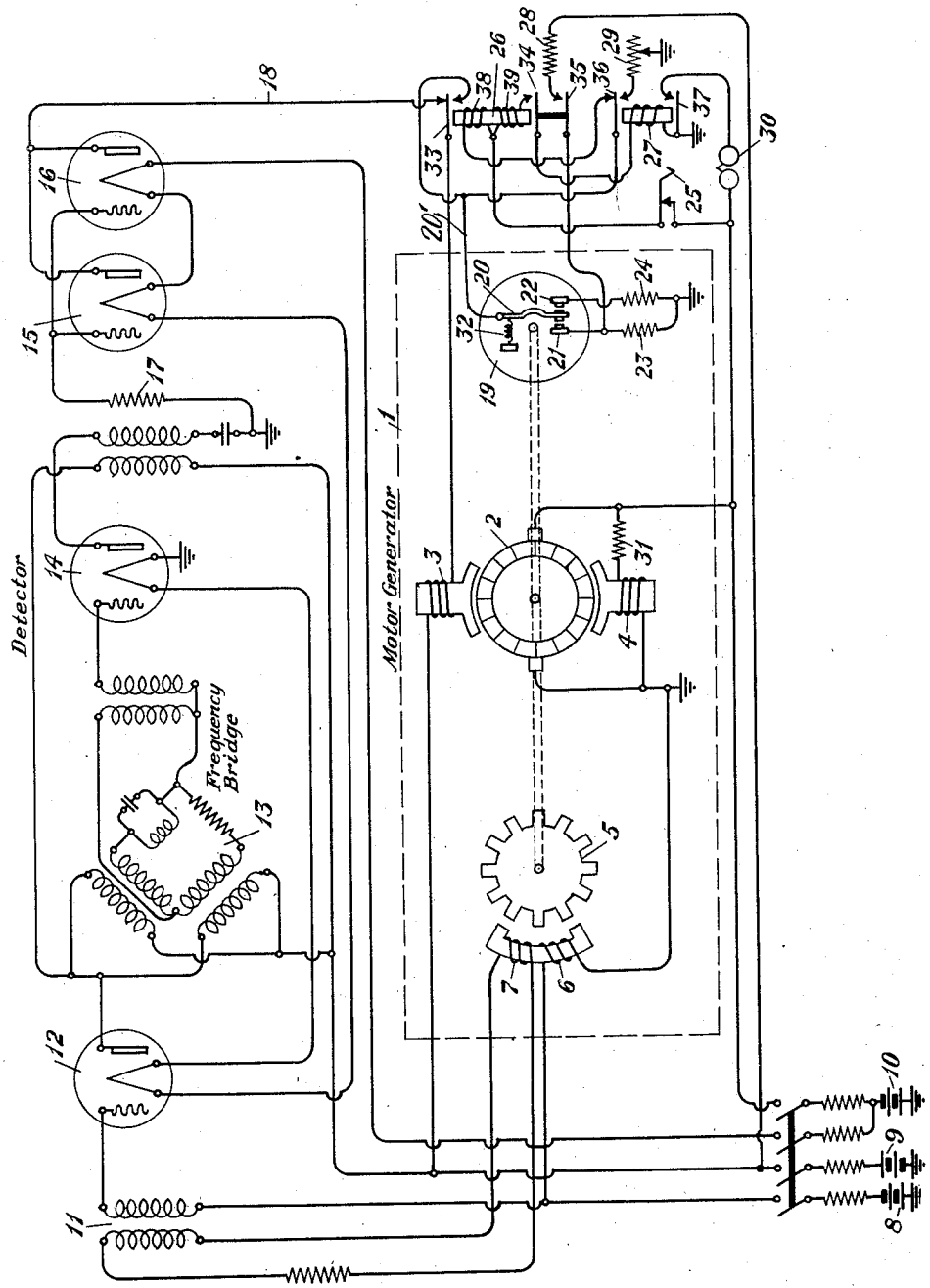

2,070,750

UNITED STATES PATENT OFFICE 2,070,750

REGULATOR SYSTEM

Wilton Treat Rea, Flushing, N. Y., assignor to American Telephone and Telegraph Company, a corporation of New York Application November 27, 1934, Serial No. 755,064

2 Claims. (Cl. 171—312)

This invention relates to an improved type of regulator system for controlling the characteristics of a dynamo-electric device, and more particularly to means for preventing the failure of operation of such a device upon any failure of operation of a portion of the regulator system.

In many cases it is desirable to operate a motor at constant speed with close precision. As an example of a motor which must be operated at constant speed may be mentioned the motor for operating the carrier current generator in a voice-frequency carrier current sytem. The speed of the motor in the above mentioned system must be held constant with precision in order to maintain the frequency of the generated current constant. One of the regular systems utilized for controlling the speed of a motor generator device in systems of the above mentioned type employs thermionic vacuum tube circuits for controlling the field excitation of a motor to maintain the speed thereof constant. If any of the vacuum tubes in such a motor speed control system should fail, or if the plate or filament battery supply for such tubes should fail, the regulating field current for the motor would not function properly and the speed of the motor-generator would begin to vary. In instances where the motor-generator is utilized to supply the carrier current for a voice-frequency carrier system, it is possible that many multi-channel voice-frequency systems might be put out of service for an appreciable period of time by the failure of a single vacuum tube or battery tap. Accordingly, it is one of the principal objects of this invention to provide arrangements whereby the speed of the motor will remain substantially constant and operative failure thereof will be prevented under conditions where apparatus, such as the vacuum tubes, in the control circuit may fail.

Other objects and features of the invention will appear more fully from the detailed description hereinafter given.

In the arrangements of this invention centrifugally operated speed alarm device is provided which controls relay transfer means in the circuit which supplies current to the regulating field of the motor. While the speed of the motor remains at a correct value, the moving member of the speed alarm will float between its associated contacts. If the speed regulator circuit should fail to operate or function properly the moving member or armature of the speed alarm will close a circuit through one of its contacts and will thereby cause the relay means to operate. The operation of said relay means accomplishes circuit changes that convert the speed alarm to a double contact speed regulator which acts to control the motor speed by varying the current flowing through the regulating field winding. The net effect will be that the motor-generator will continue to run under the control of the mechanical regulator at approximately the same speed as before the failure of the electrical speed regulating system occurred.

The invention may be more fully understood from the following detailed description when considered in connection with the accompanying drawing in the figure of which is shown a circuit diagram embodying a preferred form of the invention.

In the drawing a motor-generator system 1 is shown within the rectangle formed by dotted lines. The motor-generator includes a motor 2 having a regulating field winding 3 and a shunt field winding 4. The motor drives an alternating current generator 5 of the inductor type. This generator includes a generating field winding 6 and an armature winding 7. The batteries 8, 9, and 10 are provided for supplying current to the various windings of the motor-generator device over circuits which will be presently described.

The armature winding 7 is connected to the winding of transformer 11 which in turn is connected to an amplifying tube 12. The output circuit of the amplifier 12 is connected to a Wheatstone bridge arrangement 13 having one arm thereof in the form of a tuned circuit. The anti-resonant arm of the bridge circuit is tuned to the frequency developed by the generator when the motor 2 is operated at normal speed. A phase detector device 14 is provided and has an alternating current potential impressed on the grid thereof from the bridge circuit and an alternating potential impressed upon the plate thereof from the amplifier 12. The phase relation of the potentials impressed on the grid of the phase detector tube 14 varies with respect to the potentials impressed on the plate of such tube according to the frequency of the current produced by the generator 5. The phase detector tube 14 is coupled to the regulating tubes 15 and 16 which in turn are connected to a circuit including the regulating field winding 3 of the motor.

If the motor 2 tends to increase in speed, the generator 5 is operated to raise the frequency of the generated current. The frequency bridge circuit 13 varies the phase relation of the potential impressed upon the grid of the phase detector 14, with respect to the potential impressed upon the plate of such tube to lower the output from the phase detector tube 14. This lowers the potential drop across the coupling resistance 17 to increase the output from the regulator amplifier tubes 15 and 16. The increased output from the regulating tubes increases the current flow through the regulating field winding 3 to oppose the tendency of the motor to increase in speed. If the speed of the motor tends to decrease, a reverse action will take place in the vacuum tube circuits to decrease the current flow through the regulating field winding and hence allow the motor to increase in speed.

The above arrangements for controlling or regulating the speed of a motor-generator device are well known in the art, and no further description is considered necessary. It is pointed out that in such arrangements, if any of the vacuum tubes, such as 12, 14, 15 or 16, should fail or if their plate or filament battery should fail, the current through the regulating field winding 3 would be reduced to zero and the motor-generator would gain in speed so as to be commercially inoperative, particularly in instances where it is utilized in a voice-frequency carrier current system.

Accordingly, the arrangements of this invention provide, upon the shaft of the motor-generator, a centrifugally operated speed alarm device. This device may include a plate 19 carried by the shaft, and having an armature 20 pivotally mounted thereon. The plate is also shown as having contacts 21 and 22 mounted thereon. The armature 20 is maintained against contact 21 by spring 32 when the motor is at rest or rotating at a speed lower than normal. When the motor is rotating at a higher speed than normal, the inertia of said armature causes the tension in spring 32 to be overcome and armature 20 will rest upon contact 22. The tension of spring 32 is adjusted to such a value that it will be exactly balanced, when the motor is rotating at normal speed, by the centrifugal force of the armature 20, thereby maintaining said armature free from contacts 21 and 22.

When the motor speed is above or below normal, armature 20 will bear upon contact 22 or contact 21, respectively, and current will flow from battery 10 through release key 25, winding 38 of relay 26, armature 36 and back contact of relay 27, conductor 20', armature 20 and contact 22 or 21, and resistance 24 or 23, respectively, to ground, causing relay 26 to operate. The operation of relay 26 permits current to flow from battery 10 through release key 25, winding 39, front contact and armature 34 of relay 26, and winding of relay 27 to ground, thereby causing relay 27 to operate and relay 26 to be maintained in an operated condition. Armature 37 of relay 27 applies ground to alarm bell 30 causing it to give notification that the speed regulating circuit has failed. Armature 33 of relay 26 disconnects regulating winding 3 of motor 2 from the regulating plate circuit lead 18 and connects said winding to armature 20 of speed alarm 19. Armature 36 of relay 27 disconnects the armature 20 of speed alarm 19 from winding 38 of relay 26 and connects said armature through the variable resistance 29 to ground. Armature 35 connects contact 21 of speed alarm 19 through resistance 28 to positive battery 9.

If the speed of motor 2 is now at its normal value, current will flow from battery 9 through regulating winding 3, armature 33 of relay 26 and its front contact, armature 36 of relay 27 and resistance 29 to ground. Resistance 29 is adjusted to such a value that said current will be approximately equal to that normally flowing through regulating winding 3 when the vacuum tube speed regulating circuit is operating properly.

If, however, the speed of motor 2 is greater than normal, armature 20 will bear upon contact 22, causing resistance 24 to be connected in parallel with resistance 29. The current through regulating winding 3 will be increased thereby and will oppose the tendency of the motor speed to be greater than normal.

If the speed of motor 2 is less than normal, armature 20 will be constrained to bear upon contact 21 causing resistance 23 to be connected in parallel with resistance 29 and resistance 28 to be shunted across regulating winding 3. The values of resistance 28 and resistance 23 are such that the current through regulating winding 3 will be decreased thereby to less than its normal value and the tendency of the motor speed to be less than normal will be opposed. The speed alarm 19, when acting in the manner explained above, constitutes a centrifugally operated speed regulator.

Key 25 is provided to permit the circuit to be restored to normal when it is desired to transfer the control of motor speed to the vacuum tube circuit. The operation of said key opens the holding circuit containing winding 39 and armature 34 of relay 26 and the winding of relay 27, and allows said relays to release.

While the invention has been disclosed as embodied in certain specific arrangements which are deemed desirable, it is understood that it is capable of embodiment in many and other widely varied forms without departing from the spirit of the invention as defined by the appended claims.

What is claimed is:

1. In a speed regulator system, a motor having a regulating field winding, a regulator circuit for controlling the excitation of said regulating field winding to maintain the motor constant in speed, centrifugally operated alarm means responsive to a failure of said speed regulator circuit, a network adapted to vary the current through said regulating field winding, and switching means responsive to the operation of said centrifugal alarm means, said switching means being so arranged as to connect said network to said regulator circuit, whereby the centrifugal alarm is caused to operate as a speed regulator to maintain the speed of said motor substantially constant over a wide range of variations of load or power voltage.

2. In a speed regulator system, a motor having a regulating field winding, a regulator circuit for controlling the excitation of said regulating field winding to maintain the motor constant in speed, centrifugally operated means responsive to a failure of said speed regulator circuit, said centrifugally operated means including a lever and two contacts with which the free end of the lever, respectively engages in accordance with the speed of the motor over or under a predetermined value, a network simulating the electrical characteristics of the regulating circuit, said network including a resistance element normally connected to each contact and two resistance elements normally disconnected, and switching means responsive to the movement of the lever against the respective contacts for connecting the second corresponding resistance elements to the lever and one of the associated contacts, whereby the centrifugal means controls the current in the regulating field winding and the speed of the motor is maintained substantially constant independently of the regulator circuit.

WILTON TREAT REA.